United States Patent [19]
Nightingale et al.
[11] Patent Number: 4,587,803
[45] Date of Patent: May 13, 1986

[54] VALVE FOR DIVERTING FLUID FLOWS IN TURBOMACHINES

[75] Inventors: Douglas J. Nightingale, Jonesboro; Benjamin D. Ward, Marietta, both of Ga.

[73] Assignee: Rolls-Royce Inc., New York, N.Y.

[21] Appl. No.: 523,056

[22] Filed: Aug. 15, 1983

[51] Int. Cl.[4] ..................... F02K 3/02

[52] U.S. Cl. ..................... 60/226.1; 60/229; 60/263; 244/12.5; 244/23 D; 244/53 B

[58] Field of Search ..................... 60/229, 263, 262, 228, 60/230, 232, 226.1, 225, 244; 244/12.4, 12.5, 23 D, 53 B

[56] References Cited

U.S. PATENT DOCUMENTS

| | | | |
|---|---|---|---|
| 3,172,256 | 3/1965 | Kerry et al. | 60/229 |
| 3,181,293 | 5/1965 | Orchard et al. | 244/12.5 X |
| 3,206,929 | 9/1965 | Marchant et al. | 60/229 X |
| 3,209,535 | 10/1965 | Marchant et al. | 244/12.5 X |
| 3,255,584 | 6/1966 | Grieb | 60/263 |
| 3,266,243 | 8/1966 | Thomas | 244/12.5 X |
| 3,477,764 | 6/1969 | Denning et al. | 244/53 B |
| 3,541,794 | 11/1970 | Johnston et al. | 60/229 X |
| 3,863,867 | 2/1975 | Souslin et al. | 60/230 X |
| 3,893,638 | 7/1975 | Kelley | 60/226.1 X |
| 3,913,321 | 10/1975 | Snell | 60/226.3 |
| 3,991,782 | 11/1976 | Schwarzler | 244/53 B X |
| 4,033,119 | 7/1977 | Nichols | 60/263 X |
| 4,038,818 | 8/1977 | Snell | 60/226.3 |
| 4,205,813 | 6/1980 | Evans et al. | 60/229 X |
| 4,248,041 | 2/1981 | Wilde et al. | 60/230 X |
| 4,474,345 | 10/1984 | Musgrove | 244/53 B X |

*Primary Examiner*—Carlton R. Croyle
*Assistant Examiner*—Jeffrey A. Simenauer
*Attorney, Agent, or Firm*—Cushman, Darby & Cushman

[57] ABSTRACT

A valve for selectively changing the direction of flow of working fluid through a variable cycle engine which comprises a first and second compressor 14,16 spaced along a flow duct 26. The duct 26 having air intakes 42 leading to the second compressor 16 and outlets leading to nozzles 44. The valve comprising a sleeve 30 axially movable along the duct. The sleeve 30 having openings 31 in it in which are located doors 32. Links 36 are connected to each of the doors 32 so that as the sleeve 30 is moved axially the doors 32 are pulled open to open the air inlets 42 and the outlets and simultaneously obturate the flow duct 26. In a second position of the sleeve 30 the doors 32 and the sleeve 30 close off the air inlets and outlets and open the duct to allow the first compressor to supercharge the second compressor.

5 Claims, 4 Drawing Figures

10
12
14
16
18
20
22
24
26
28
30
31
32
34
36
37
42
44
48
62

10
12
14
16
18
20
22
24
26
28
30
31
32
34
36
37
42
44
48
52
62
III
III 42
32
36
130
37
50
34
49
48
62
44
52
54
56
57
58
60
46

46
30
31
36
32
37
130
30
31
36
32

VALVE FOR DIVERTING FLUID FLOWS IN TURBOMACHINES

This invention relates to variable cycle gas turbine engines, and in particular to valves for selectively changing the direction of flow of the working fluid through the engine.

The present invention is particularly concerned with variable cycle engines of the type generally disclosed in U.S. Pat. Nos. 3,913,321 or 4,038,818 (assigned to Rolls-Royce Limited). In general, these engines comprise a first axial flow compressor and a core engine comprising, in flow series, a second compressor combustion equipment, and turbines to drive the first and second compressors, and the engine is capable of operating in two distinct modes. These modes are namely a "series flow⇄ mode and a "parallel flow" mode. In the series flow mode the first and second compressors are connected in flow series and the whole output flow of the first compressor supercharges the second compressor. In the "parallel flow" mode the output flow of the first compressor is prevented from supercharging the second compressor and is discharged to ambient air through either a by-pass duct or through fixed or vectorable discharge nozzles, and simultaneously an auxilliary air intake is opened up to allow air to enter the second compressor.

Variable cycle engines of the type described above offer many advantages, particularly for aircraft requiring vertical take-off and leanding and also supersonic forward flight capabilities. The engine performance can be optimised for vertical take-off and landing and subsonic flight during the parallel flow mode and optimised for forward supersonic flight during the series flow mode. In this way, for vertical flight, the well proven advantages of engines such as the Rolls-Royce Limited Pegasus engine (used to power the British Aerospace AV8A Harrier or the British Aerospace/McDonnell Douglas AV8B) can be exploited whilst enabling efficient use of the engine in the series flow mode for supersonic flight.

To enable the output flow from the first compressor to be redirected selectively for series or parallel modes of operation, it is usual to provide a diverter valve downstream of the first compressor but upstream of the second compressor. Examples of such diverter valves are described in the above mentioned patents. The problems associated with prior known diverter valves reside in their complexity, weight, cost and disruptive effect on the thermodynamic cycle of the engine during transition from the series flow mode to the parallel flow mode. It is very difficult to achieve transition from the series flow mode to the parallel flow mode without inducing variations in flow conditions at the inlet to the second compressor. These variations may be localised and vary circumferentially around the fluid flow annulus of the second compressor and have a deleterious effect on the performance of the engine. In general some of these problems are due to the speed of the operation of the diverter valve means and the fact that many movable parts such as doors and flaps are positioned in the airflow path and have to be operated in unison.

An object of the present invention is to provide a variable cycle engine of the type described above with a diverter valve means which is simple to operate, is lightweight, relatively inexpensive and provides a relatively uncluttered flow path during both modes of operation.

The invention will now be described, by way of example only, with reference to the accompanying drawings, in which:

FIG. 1 shows the engine in a "series flow" mode of operation and FIG. 2 shows the engine in a "parallel flow" mode of operation.

Figure 1:
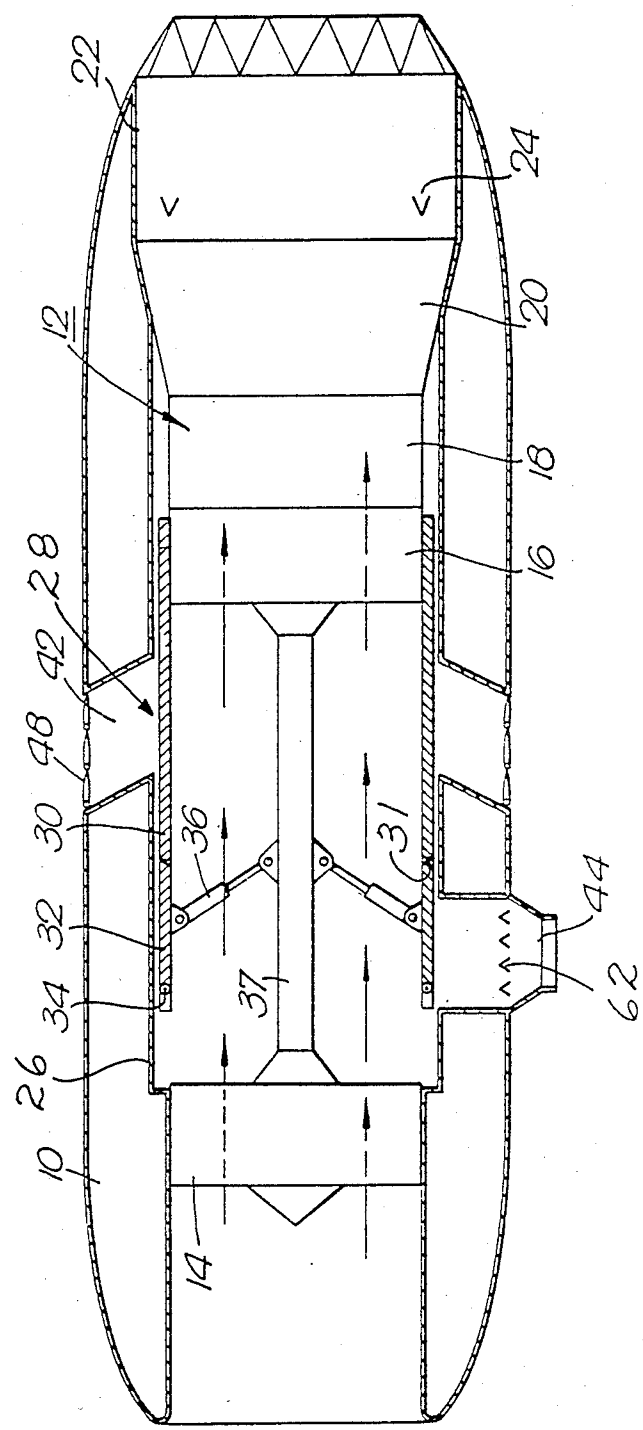
FIG. 1 and FIG. 2 show schematically a variable cycle engine of the type described above incorporating the present invention.
Figure 2:
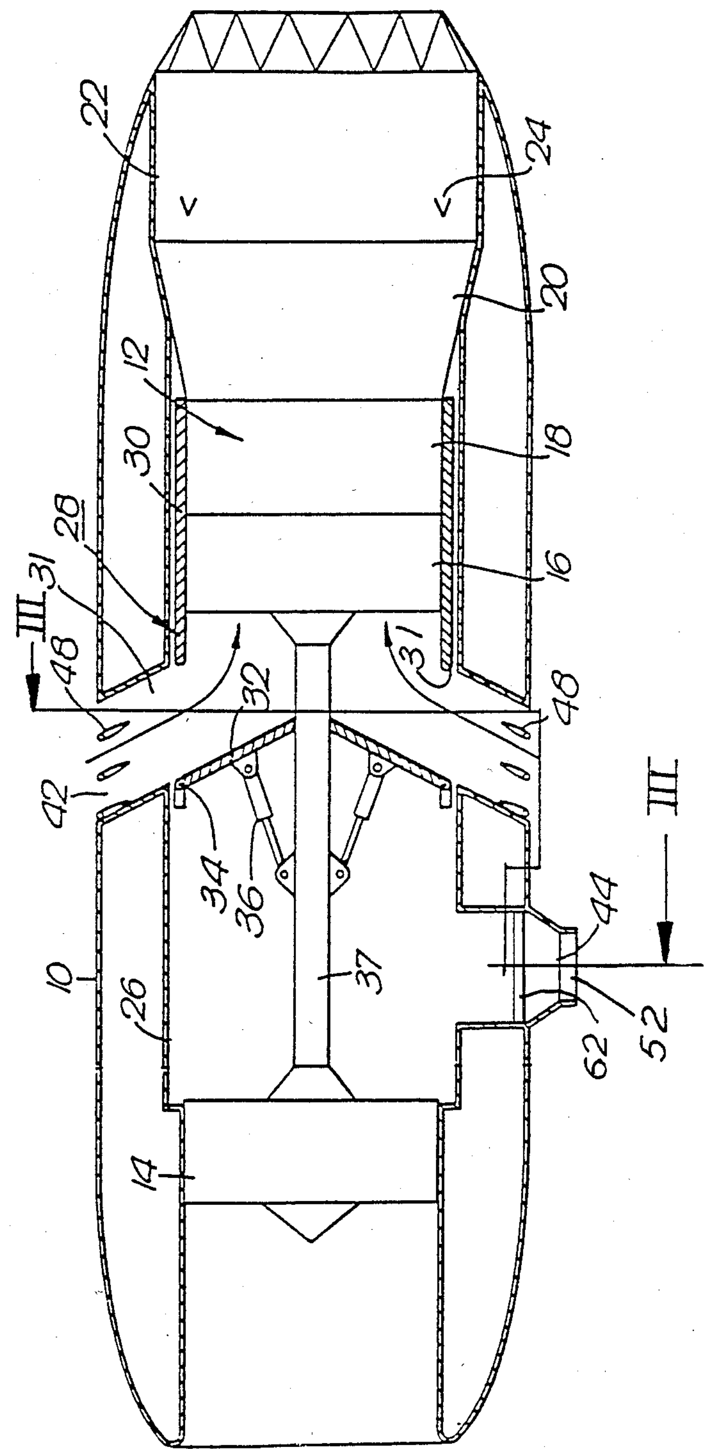

Referring to FIGS. 1 and 2, there is shown schematically a generally round nacelle 10 which houses a gas turbine engine 12 comprising, in flow series, a first axial flow compressor 14 and a core engine. The core engine comprises a second axial flow compressor 16, combustion means 18, turbine means 20 connected to the compressor means 14 and 16 to drive the compressor means, a jet pipe 22 and afterburning equipment 24.

The first and second axial flow compressors are spaced axially from each other by a duct 26 which houses a diverted valve 28. The diverter valve 28 consists of a hollow tubular sleeve 20 which is free to move axially along the duct 26. A plurality of doors 32 are circumferentially spaced around the engine axis inside the duct 26. One of the ends of each door is pivotally mounted on the sleeve 30 at hinge 34. A plurality of telescopic links 36 are connected at one of their ends to a tube 37 which covers the shaft 130 that connects the front compressor 14 to the turbine means 20. The other end of each link 36 is connected to one of the doors at a point which is adjacent to the centre of pressure of the gases acting on each door, when the doors are in the position shown in FIG. 2. The doors 32 are shaped and positioned such that in a first position of the sleeve 30 they lie along the length of the duct 26 and obturate the openings 31 in the sleeve 30. In this position the sleeve 30, together with the doors 32, provide a flow path from the first axial flow compressor 14 to the second axial flow compressor 16, as shown in FIG. 1. This position of the sleeve 30 enables the engine to operate in a "series flow" mode of operation.

FIG. 2 shows the engine in the "parallel flow" mode. In this mode the sleeve 30 is translated axially along the duct from the position shown in FIG. 1. The telescopic links 36 are caused to pivot about their pivotal attachment to the tube 37 and cause the blocker doors 32 to be swung inwards until each door co-operates with its adjacent door and with the tube 37 to obturate the duct 26. The doors 32 thereby uncover the openings 31 in the sleeve 30 and thereby open auxilliary air intakes 42. Translation of the sleeve 30 also uncovers the outlet to the front nozzles 44. This provides a flow path from the first axial flow compressor 14 to the front nozzles 44 and also provides a flow path whereby ambient air may flow into the auxilliary air intake 42 and into the inlet of the second compressor 16. It should be noted the nozzles 44 shown in the schematic views of FIGS. 1 and 2 are out of position relative to the positions of the air intakes 42. However, by reference to FIG. 3, the relative positions of the axially upstream nozzles 44 to the air intakes 42 shows that the same are angularly spaced therefrom.

Figure 3:
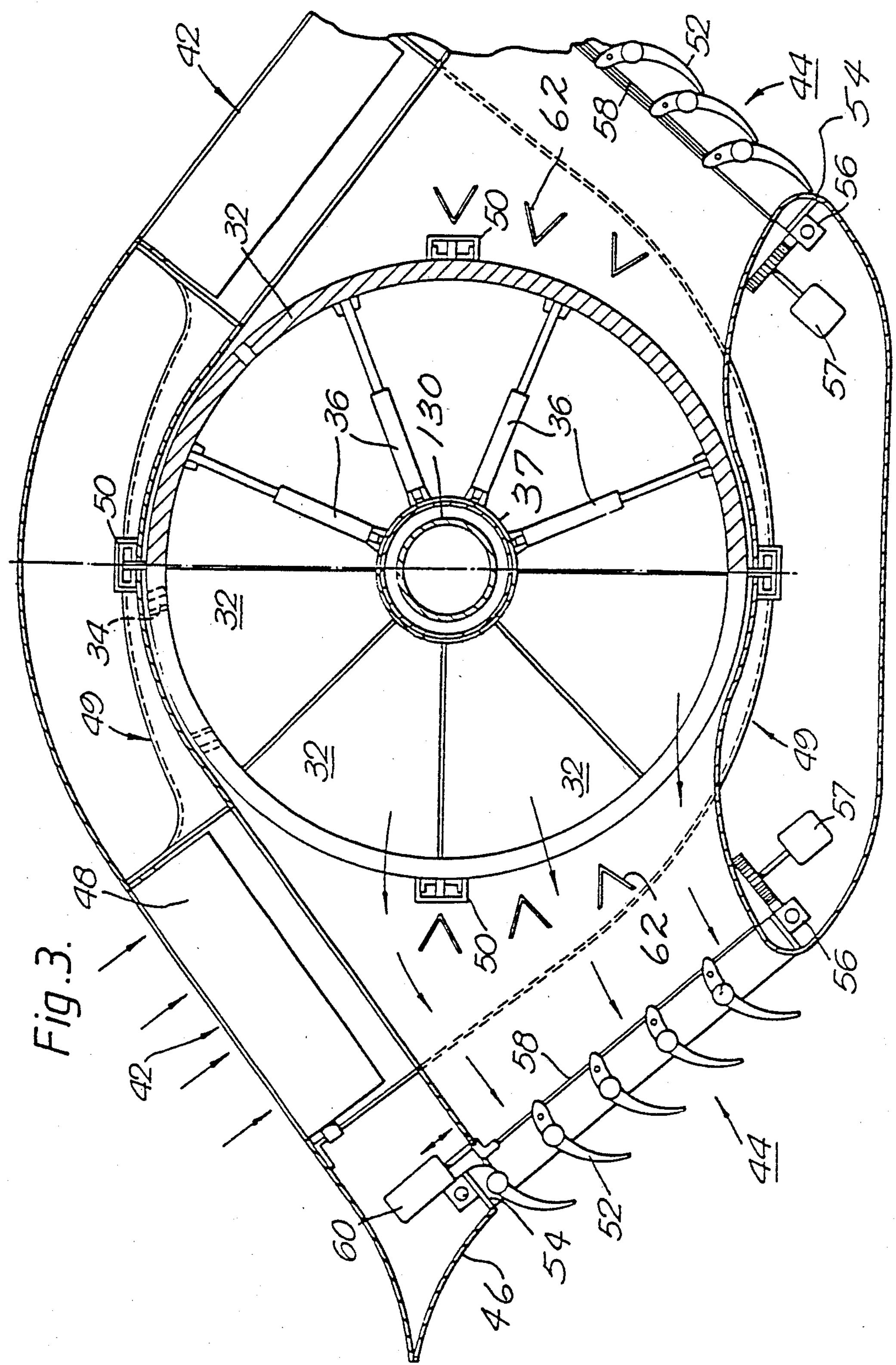
FIG. 3 is a cross-sectional view taken on the line III—III of FIG. 2 of part of the engine shown schematically in FIGS. 1 and 2, the view illustrating in greater detail part of the valve for redirecting air flow through the engine and the construction of front nozzles 44.

Referring to FIG. 3 there is shown a vertical cross-sectional view of an engine similar to that of FIG. 2 taken along the staggered line III—III. The left hand side of FIG. 3 shows the doors 32 in the "parallel flow" position of FIG. 2; the right hand side of FIG. 3 shows the engine in the "series flow" mode of FIG. 1. The aircraft fuselage 46 is effectively a double skin construction. The air intakes 42 are provided with shutters 48 which blow inwards when the sleeve 30 is moved to unblock them. The air intakes 42 open into a plenum chamber defined by a wall 49 which conducts the air from the intakes 42 into the second compressor 16 downstream of the blocker doors 32. The wall 49 houses tangential rollers 50 which are arranged along the length of the duct 26 to support the sleeve 30 as it is translated axially.

The front nozzles 44, which in FIGS. 1 and 2 are shown schematically as projecting into the free air stream, are in fact housed within the double skinned fuselage 46 as shown in FIG. 3 so as to reduce drag and provide a streamlined air frame for fast forward flight. In a preferred embodiment, the nozzles 44 take the form of a plurality of vanes 52 pivotally mounted in a ring 54 supported in a bearing 56. The nozzles are capable of rotation in the bearing by means of an actuator 57, and all the vanes 52 of each nozzle are linked together by a rod 58 which is moved by an actuator 60 (shown schematically). All the vanes of each nozzle are moved in unison for the purpose of varying the outlet area of the nozzles and by rotating the nozzles in their bearings 56 the thrust produced by the nozzles can be vectored thereby selectively to produce upward thrust (for VTOL) or forward thrust for forward flight. During the series mode of operation the vanes 52 close off the nozzles 44 to provide a streamlined fuselage.

Upstream of the nozzles 44 there is provided a thrust augmentor in the form of a plurality of reheat gutters 62. In this way additional fuel can be burnt upstream of the nozzles to increase the thrust produced by the nozzles and the nozzle outlet area increased by opening the vanes 52 to cope with the increased flow.

Figure 4:
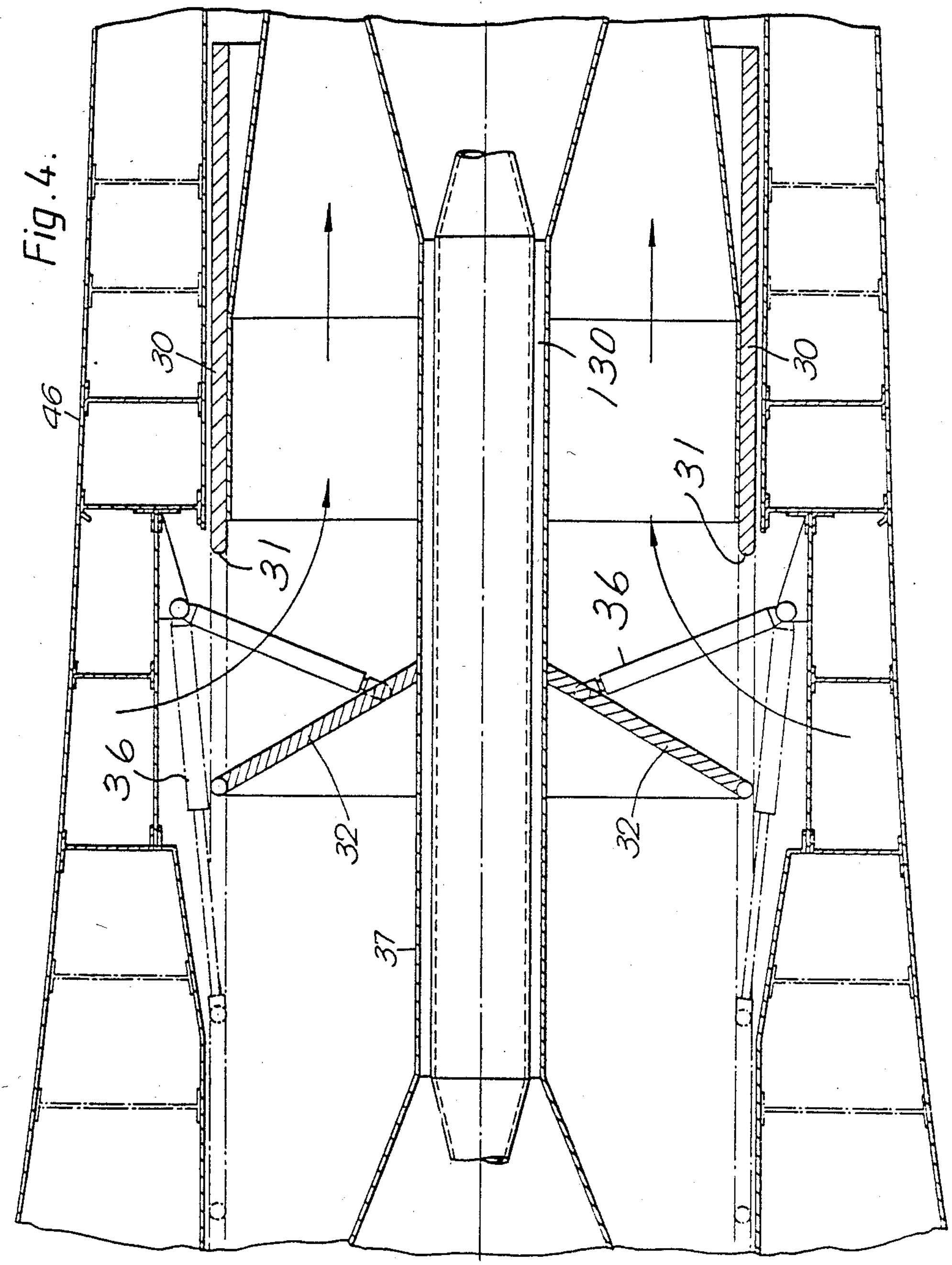
FIG. 4 is a cross-sectional view of a second engine constructed in accordance with the present invention and shows the engine in a "parallel flow" mode of operation.

Referring to FIG. 4 the engine is almost identical to that shown in FIGS. 1 and 2 except that the links 36 for actuating the doors 32 are provided outside of the sleeve 30. Furthermore the links 36, in this modification are not carried by the tube 37 that covers the shaft 130. Instead the doors 32 are opened and closed by means of telescopic links 36 housed in a recess which allows the links to be extended in the series mode to pull the door outwards, and compressed in the parallel mode to push the doors inwards. In other respects the construction of the engine is identical to that of FIGS. 1 to 3.

We claim:

1. A fluid flow diverter valve for a gas turbine engine of the type that comprises a fluid flow duct, first and second axial flow compressors spaced along the duct, a combustible means downstream of the compressors, turbine means downstream of the combustion means connected to the compressors to drive the compressors, one or more air outlet openings in the duct wall of a region between the first and second compressors, and an auxiliary air intake in the duct wall spaced along the duct from the one or more outlet openings and located at a region between the one or more outlet openings and the second compressor, the valve comprising: a hollow tubular sleeve extending co-axially along the duct, the sleeve being movable in directions along the duct, and being provided with one or more openings which in a first position of the sleeve uncover the auxilliary air intake in the duct wall; a plurality of doors each of which is pivotally mounted at one of its ends on the sleeve, the doors being spaced around the axis of the duct and being shaped and positioned so that in a first position of the doors they lie along the length of the duct and at least one of the doors obturates the one or more openings in the sleeve and in a second position of the doors the free end of each door is moved radially inwards and each door co-operates with the other doors and thereby obturate the duct; a plurality of links each of which is pivotally mounted at one end to a member which is fixed and is pivotally connected at its other end to one of the doors; an actuator for translating the sleeve from the first position of the sleeve where the sleeve and the doors obturate the one or more openings in the duct wall and the auxilliary air intake and provides a flow path from the first compressor to the second compressor, to a second position of the sleeve where the links pull open the doors and move them to a position where they obturate the flow path from the first compressor to the second compressor and the sleeve uncovers the one or more outlet openings in the duct wall and uncovers the auxilliary air intake.

2. A valve according to claim 1 wherein the fixed member on which the links are pivoted is located inside the sleeve.

3. A valve according to claim 1 wherein the fixed member on which the links are pivoted is located outside the sleeve.

4. A valve according to claim 1 wherein the one or more outlet openings lead to one or more vectorable nozzles.

5. A valve according to claim 4 wherein a fuel burning means is provided upstream of the nozzles.

* * * * *